United States Patent Office 3,367,061
Patented Feb. 6, 1968

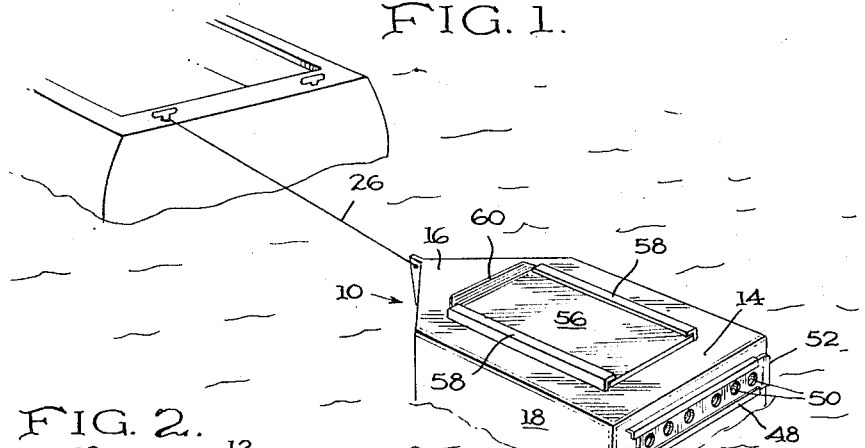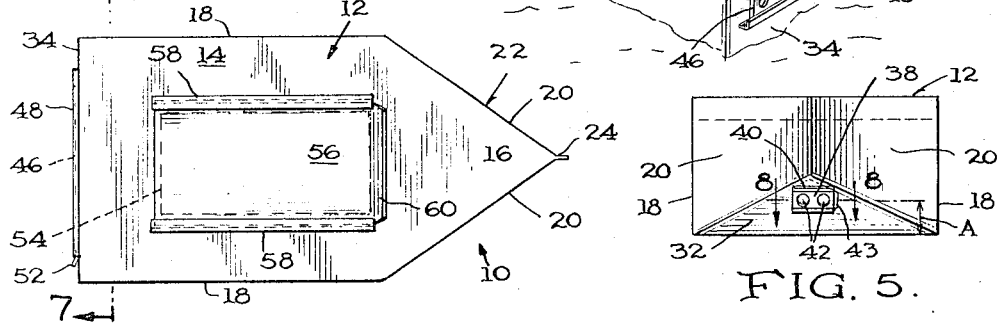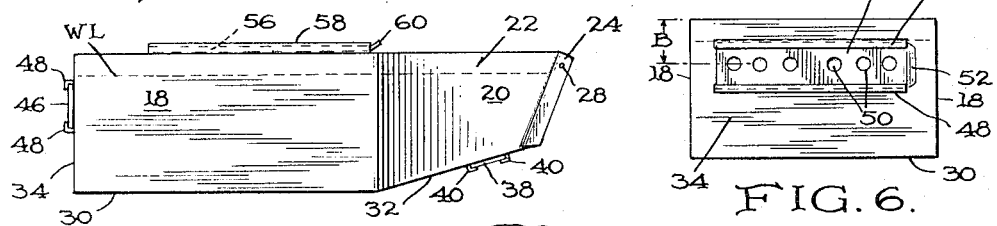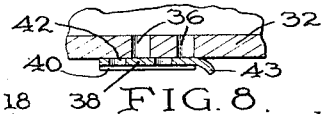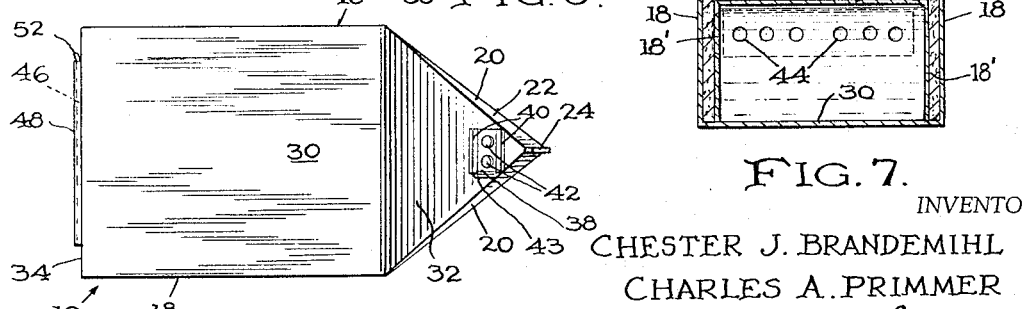

3,367,061
COMBINED FLOATING TRAILER AND
REFRIGERATION DEVICE FOR FISH
Chester J. Brandemihl and Charles Primmer, Bozeman, Mont.; James K. Brandemihl, administrator of the estate of said Chester J. Brandemihl, deceased, assignor to said Charles A. Primmer.
Filed Sept. 13, 1965, Ser. No. 486,696
5 Claims. (Cl. 54—55)

ABSTRACT OF THE DISCLOSURE

A hollow, imperforate fish trailer and refrigeration device having adjustable valve plates located at different levels on its front and back ends to provide a water control baffle which regulates the water flow through the interior of the trailer and keeps the fish alive. Furthermore, a foamed thermoplastic interior lining imparts added buoyancy to the trailer while serving as an insulation material when the fish are refrigerated.

---

This invention relates to a floatable receptacle adapted to be towed in a lake or stream or the like to keep fish alive after they have been caught, and also adapted to serve as a refrigerated receptacle for keeping the fish fresh until ready for use.

The combined fish towing and cooling device of the invention is particularly suitable for holding trout and keeping them alive after they have been caught, and for refrigerating the trout while the fisherman is traveling home with the catch. However, the device of the invention can also be used for holding and refrigerating other types of fish.

A particular problem arises in connection with keeping trout alive after they have been caught. While many fish such as "catfish," certain species of bass, and various other types of fish may be kept alive and fresh for the better part of a day by simply placing them in a wet saturated barley sack or similar covering, trout cannot be handled in the same manner. Trout cannot live in still water, and will die if kept out of water for several minutes. Furthermore, trout spoil very easily, and the meat starts to separate from the bones within a few hours if they are not kept cool or submerged in cold water. This makes it very difficult for the average fisherman to arrive home with real fresh trout for the frying pan. In fact, most people agree that trout are best cooked right at the fishing area as soon as caught.

While various fish trailer devices have been developed in the prior art which are supposed to be adapted for towing behind a moving boat, we have found that none of the prior art devices with which we are familiar is satisfactory when towed behind a moving boat. For example, with some of the prior devices when the towing boat speeds up, it causes the fish trailer to become flooded with excess water flowing therethrough, causing the fish in the trailer to die from being jammed against the back and sides of the fish trailer. Also, the excess water flow through the prior art fish trailers due to the increase speed of the towing boat, frequently causes the prior art fish trailers to become so flooded that they become submerged.

A further disadvantage of many fish trailers of the prior art is that they are provided with a hinged access door or lid for placement of the fish inside the container, or for removal of the fish therefrom. We have found by experience that the hinged access lid or door is unsatisfactory since it permits the fish to jump out when the lid is opened.

Furthermore, none of the fish trailer devices of the prior art with which we are aware are also adapted to be used for refrigerating the fish, which is an important advantage of the present invention.

Accordingly, it is an object of the present invention to provide a floatable container for receiving trout or other fish, which may be towed in a lake, stream, or river behind a boat or other towing means, to keep the fish alive after they are caught.

It is another object of the present invention to provide a container or fish trailer adapted to receive fish and to be towed through the water, having an improved means for controlling the flow of water passing through the container as it is being towed.

It is a further object of the invention to provide a towable container for holding live fish, particularly trout, in which the water flow control means is so constructed as to prevent jamming of the fish against the back and sides of the interior of the container due to excess water flow.

It is a further object of the invention to provide a towable fish trailer including adjustable flow control means in both the forward and back ends of the trailer, the forward and back flow control means being so constructed and located as to provide a water control baffle which keeps sufficient water in the fish trailer when the towing boat speeds up considerably, but yet prevents flooding of the fish trailer.

It is a further object of the invention to provide a fish trailer which may be used as a refrigerator for the fish, and which has the bottom end thereof so constructed as to be watertight and leakproof.

It is still a further object of the invention to provide a towable container for receiving live fish which is provided on the interior walls thereof with a floatation material which makes the container buoyant so that it will continue to float even though it becomes disconnected from the towing means, the floatation materials also providing thermal insulation which permits the container to be used for refrigerating the fish.

In achievement of these objectives, there is provided in accordance with an embodiment of this invention a fish trailer adapted to be towed behind a boat or other suitable towing means. The fish trailer is closed except for water inlet openings at the forward end of the trailer and outlet openings at the back end of the trailer, and except for an access opening provided in the upper wall of the fish trailer. The water inlet openings are constructed to have a total area less than the total area of the outlet openings and are located at the forward end of the trailer at a level substantially below the level of the outlet openings in the rear wall of the trailer. Adjustable valve means are provided for the inlet and outlet openings which permit adjustment of the water flow through the fish trailer. A slidable lid is provided to cover the access opening in the upper wall of the fish trailer, the lid being movable to permit positioning fish in or removing fish from the interior of the fish trailer. In accordance with an important feature of the construction, the walls of the fish trailer are lined with a suitable thermal insulating material such as polystyrene foam or polyurethane foam or the equivalent thereof, so that when the inlet and outlet water flow openings of the fish trailer are closed by means of the adjustable valve means, and assuming the slidable lid for the access opening is in closed position, the fish trailer may then be used for refrigerating the fish. The insulating material also provides necessary buoyancy for the fish trailer.

Further objects and advantages of the invention will become apparent from the following description taken in conjunction with the accompanying drawing, in which:

FIG. 1 is a perspective view of the combined fish trailer and cooler being towed behind a boat;

FIG. 2 is a top plan view of the fish trailer and cooler of FIG. 1;

FIG. 3 is a side elevation view of the fish trailer and cooler;

FIG. 4 is a bottom plan view of the combined fish trailer and cooler;

FIG. 5 is a front elevation view of the fish trailer and cooler;

FIG. 6 is a rear elevation view of the fish trailer and cooler;

FIG. 7 is a view in section along line 7—7 of FIG. 2; and

FIG. 8 is a view in section along line 8—8 of FIG. 5.

Referring now to the drawing, the combined fish trailer and cooler of the invention is generally indicated at 10 and includes a top wall generally indicated at 12 incuding a rectangular top wal portion 14 which merges at the forward end thereof with a triangular-shaped top wall portion 16. The walls of the fish trailer are preferably formed of galvanized sheet metal or the equivalent thereof and are formed by imperforate closed surfaces except for closable water flow openings at the front and rear of the fish trailer, and except for a closable access opening in the top wall of the trailer, as will be explained hereinafter.

The fish trailer and cooler also includes opposite rearward side walls 18 which extend in spaced parallel relation to each other for the length of the rectangular portion 14 of top wall 12, and inwardly converging opposite forward side walls 20 which merge at the forward ends thereof to form the prow 22 of the towable fish trailer. A vane-like projection 24 extends from the forward end of prow 22 and is provided with a suitable means such as the aperture 28, as shown, or a tow ring (not shown), to receive a tow line 26. Tow line 26 may be attached to a suitable securing means on the back end of a tow boat, or, alternatively, the tow line may be attached to the fisherman's belt.

The bottom wall of the fish trailer, as best seen in FIG. 4, is defined by a generally rectangular rearward bottom wall portion 30, and by an upwardly and forwardly slanted forward bottom wall portion 32. The forward bottom wall portion 32 joins the lower edges of the inwardly converging forward side walls 20.

The forward bottom wall portion 32 is provided intermediate the lateral width thereof, in the illustrated embodiment, with two laterally spaced circular openings 36 which may, for example, each have a diameter of ⅞ inch.

A sliding cover or valve plate 38 guided for sliding movement by guides 40, and having two laterally spaced openings 42 therein, is mounted for sliding movement with respect to holes 36 in the forward bottom wall 32. The valve plate 38 may be moved to cause holes 42 in the valve plate to be either in partial or complete registry with the openings 36 in forward bottom wall 32, or may be slidably moved to a closed position in which it is completely out of registry with openings 36 in forward bottom wall 32.

Slidable valve plate 38 is provided at one end thereof with a finger grip portion 43 which permits plate 38 to be gripped for sliding movement. Valve plate 38 may be moved to the position in which it is shown in FIGS. 4, 5, and 8, in which openings 36 in forward bottom wall 32 are completely closed, or to a position in which the openings 42 in plate 38 are in either parallel or complete registry with the openings 36.

The rear wall 34 of the fish trailer is provided adjacent the upper portion thereof with a plurality of outlet openings 44, six outlet openings 44 being provided in the illustrated embodiment. A slidable valve plate 46 is supported for sliding movement with respect to outlet openings 44 by means of guides 48. The slidable valve plate 46 is provided with a finger grip portion 52 at one end thereof which permits the valve plate to be slidably moved. Valve plate 46 is provided with the same number of openings 50 therein as there are outlet openings 44 in rear wall 34, and the valve plate may be moved from a position in which the outlet openings 44 are completely closed by the valve plate, which would be the case where container 10 is being used for refrigeration purposes, to various intermediate positions in which there are varying degrees of opening of outlet openings 44, to a completely open position in which the outlet openings 50 in valve plate 46 are in complete registry with outlet openings 44 of rear wall 34.

The horizontally slidable valve plates 38 and 46 insure a straight line water level and provide sliding straight line values completely different than those shown by prior art patents.

It is an important feature of the construction that the inlet openings in forward bottom wall 32 are fewer in number than the number of outlet openings 44 in rear wall 34, and that inlet openings 36 have a total combined inlet area substantially smaller than the combined area of outlet openings 44.

For example, in the illustrated embodiment, there are two circular inlet openings 36 in forward bottom wall 32, each having a diameter of ⅞ inch, while in rear wall 34, there are six circular outlet openings 44, each also having a diameter of ⅞ inch. Thus, in the illlustrated embodiment which is given by way of example only, the total possible inlet area when inlet openings 36 are fully open is only one-third of the total possible outlet area when outlet openings 44 are fully open.

A further important feature of the construction is the fact that inlet openings 36 are placed near the lowermost surface of the front of the fish trailer, while outlet openings 44 are placed near the uppermost surface of the back end of the fish trailer. In a typical example, the vertical distance "A" (see FIG. 3) of the horizontal centerline of inlet openings 36 from the horizontal surface of bottom wall 30 is 2 inches, while the vertical distance "B" (see FIG. 6) from the horizontal centerline of outlet openings 44 to the top wall surface 14 is 2¾ inches. Since, in the example given, the total height of the fish trailer 10 is 8 inches, the distance from the horizontal centerline of inlet openings 36 to the horizontal centerline of outlet openings 44 is 3¼ inches. The relative area of the front inlet and rear outlet water flow openings, and the fact that the rear outlet openings are positioned a substantial vertical distance above the front inlet openings, combine to produce a baffle effect which keeps water in the interior of the fish trailer when the towing boat is speeded up, and yet prevents rapid water flow through and flooding of the fish trailer when the towing boat is speeded up, thus insuring that the fish have an adequate but not an excessive supply of water. The construction features just mentioned also insure proper attitude of the fish trailer in the water, the upward direction of water flow through the fish trailer from the lower inlet openings 36 to the higher outlet openings 44 tending to make the trailer rise up in the water, and helping to prevent it from sinking.

Top wall portion 14 of the fish trailer is provided with an access opening 54 therein, which is normally closed by horizontally movable slidable top cover 56 guided for movement by guide members 58. Slidable cover 56 is provided with a finger grip portion 60 at the forward end thereof to facilitate sliding movement of the cover.

Slidable lid or cover 56 may be opened to permit positioning of newly caught fish in or removal of fish from the interior of the fish trailer. The slidable construction of lid or cover 56 is of particular advantage over the hinged lids frequently provided in prior art fish trailers, since the live fish already in the fish trailer cannot jump out when the sliding door is slightly opened to permit loading the freshly caught fish. Also, the sliding lid can be easily removed for cleaning thereof, or for unloading the fish.

In accordance with an important feature of the construction, top wall 12, including portions 14 and 16 thereof, the opposite rearward side walls 18, the opposite forward inwardly converging side walls 20, and the rear wall 34, are all lined with a combined floatation and thermal insulating material 62 such as "Styrofoam" (polystyrene foam), or polyurethane foam, or the equivalent thereof, which has a specific gravity less than that of water and thus serves as a floatation material imparting buoyancy to the fish trailer, and which also serves as a thermal insulating material to permit use of the fish trailer as a refrigerated container. Lining material 62 is held in place by inner metal panels of galvanized sheet metal or the like, such as those indicated at 14′ and 18′ in FIG. 7. In the preferred embodiment bottom wall portions 30 and 32 of the fish trailer are not lined with the lining material 62, although these bottom wall portions could be lined if desired. However, it is believed that adequate refrigeration is obtained without lining of the bottom wall portions 30 and 32 with insulating material 62. In providing an insulating lining for rear wall 34 and top wall 12, suitable openings or passages are provided in the insulating lining for the outlet water flow passages 44 in rear wall 34, and for the access opening 54 in top wall 12. Also, if forward bottom wall portion 32 is provided with an insulating lining 62, suitable openings or passages are provided through the insulating lining for water inlet openings 36. The sliding lid 56 may also be lined with insulating material 62 if desired.

The bottom wall portions 30 and 32 of the fish trailer serve as an ice and fish drip pan. The lower bottom portion of the fish trailer is made waterproof and drip proof by soldering or otherwise suitably waterproofing all seams at meeting edges of the walls of the trailer, up to a suitable height, such as approximately 2 inches from the bottom surface of the trailer. If water collects on the inside surface of the bottom wall during the trip home, when the fish trailer is being used as a refrigerator, the collected water may be drained out through either the front openings 36 or through the rear openings 44 by suitably tripping the fish trailer. Of course, it is necessary that the corresponding slidable valve plate 38 or 46 be in open position when such drainage is taking place.

In constructing the fish trailer, the weight of the various components is made such that when the trailer is loaded with fish, a trailer having a vertical height of 8 inches will be submerged approximately 6 inches in the water, the typical water line being indicated in dotted line at WL in FIG. 3, with approximately 2 inches of the fish trailer projecting above the surface of the water.

In using the fish trailer while fishing, the trailer is towed behind a boat or is attached to the fisherman's belt by means of a tow line 26. The sliding valve plate 38 at the forward end of the trailer and the sliding valve plate 46 at the back end of the trailer are slidably moved to provide desired openings of these two valve plates to permit the desired water flow through the fish trailer. For example, the valve plates may be adjusted to provide a maximum degree of opening and a maximum water flow when trolling at slow speeds, and may be closed down for higher boat speeds, in order to change the depth of the water in the container and the attitude of the container in the water.

As fish are caught, the sliding lid or cover 56 is partially opened to load the live fish into the interior of the fish trailer. As the fish trailer is being towed through the water, the flow of water through the trailer keeps the fish alive, apparently due to the water being forced through the gills of the fish. The water flowing through the fish trailer will even revive a fish so that it is in better condition an hour after being caught than it was when it was put inside the fish trailer. By use of the fish trailer of the invention, the fish are kept alive and may be sorted out as to size at the end of the day.

The relative sizes and locations of the water inlet and outlet openings at the front and back of the fish trailer provides a baffle and water flow control which insures an adequate water level inside the trailer at all times, and yet, when the towing boat speeds up, prevents flooding of the trailer with consequent jamming of and injury to the fish, and sinking of the trailer.

After the fishing trip is over and it is desired to refrigerate the fish on the trip home or until the fish are ready to be used, the sliding cover 56 may be opened and ice may be placed inside the interior of the fish trailer to keep the fish cold. The sliding valve plates 38 and 46 in the front and back portions of the trailer are moved to fully closed position when the trailer is being used for refrigeration purposes. The watertight bottom of the fish trailer prevents any leakage onto the floor of the car or other vehicle during the trip home.

It can be seen from the foregoing that there is provided in accordance with this invention an improved combined fish trailer and cooler or refrigeration device which permits fish to be maintained in a fresh condition after being caught and until ready for use, and which is particularly suitable, although not restricted to, storing trout after they have been caught and until they are ready for use.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What we claim as our invention is:

1. A combined floating trailer and refrigeration device for fish or the like comprising a hollow imperforate receptacle formed by spaced top and bottom walls, spaced side walls, and spaced forward and back ends, a water inlet means at the forward end of said receptacle, inlet valve means adjustable to control water flow through said inlet means, water outlet means at the back end of said receptacle, outlet valve means adjustable to control water flow through said outlet means, each of said valve means being adjustable from a fully open position through various intermediate positions to a fully closed position, said outlet means having a substantially larger available water flow path than the available water flow path of said inlet means and being positioned at a substantially higher level on said receptacle than said inlet means, an access opening in said top wall of said device for positioning fish therein and removing fish therefrom, closure means for said access opening, and means on said device having combined buoyant and thermal insulating characteristics whereby to impart buoyancy to said device for use as a towable fish trailer and to impart thermal insulating characteristics to said device for use in refrigerating the fish.

2. A combined floating trailer and refrigeration device as defined in claim 1 wherein said means having combined buoyant and thermal insulating characteristics comprises a plurality of inner panels spaced from the interior surfaces of said side walls and said top wall, and a lining formed from a foamed thermoplastic having a specific gravity less than that of water, said panels retaining said lining in fixed position adjacent said side walls and said top wall.

3. A combined floating trailer and refrigeration device as defined in claim 1 wherein said inlet valve means comprises a pair of guide members and a slidable valve plate guided for movement by said members, said plate having a plurality of openings therethrough to pass the water flow through said inlet means into the interior of said receptacle.

4. A combined floating trailer and refrigeration device as defined in claim 1 wherein said outlet valve means comprises a pair of guide members and a slidable valve plate guided for movement by said members, said plate having a plurality of openings therethrough to pass the water flow from the interior of said receptacle through said outlet means.

5. A combined floating trailer and refrigeration device as defined in claim 1 wherein said closure means comprises a pair of guide members and a slidable cover guided by said members for movement in a horizontal plane parallel to said top wall.

References Cited
UNITED STATES PATENTS

| | | | |
|---|---|---|---|
| 1,942,756 | 1/1934 | Howard | 43—56 |
| 2,149,996 | 3/1939 | Gulden | 43—56 |
| 2,968,887 | 1/1961 | Woolworth | 43—56 |
| 2,974,437 | 3/1961 | Stadler | 43—55 |
| 3,196,576 | 7/1965 | Thomas | 43—56 |

HUGH R. CHAMBLEE, *Primary Examiner.*